US012770630B2

(12) United States Patent
Atti et al.

(10) Patent No.: US 12,770,630 B2
(45) Date of Patent: Oct. 20, 2026

(54) EFFICIENT CODING OF TRANSIENTS IN TRANSFORM-DOMAIN

(71) Applicant: APPLE INC., Cupertino, CA (US)

(72) Inventors: Venkatraman Atti, Cupertino, CA (US); Dipanjan Sen, Dublin, CA (US)

(73) Assignee: APPLE INC., Cupertino, CA (US)

( * ) Notice: Subject to any disclaimer, the term of this patent is extended or adjusted under 35 U.S.C. 154(b) by 78 days.

(21) Appl. No.: 18/624,865

(22) Filed: Apr. 2, 2024

(65) Prior Publication Data

US 2024/0404536 A1 Dec. 5, 2024

Related U.S. Application Data

(60) Provisional application No. 63/505,838, filed on Jun. 2, 2023.

(51) Int. Cl.
*G10L 19/022* (2013.01)
*G10L 19/038* (2013.01)

(52) U.S. Cl.
CPC .......... *G10L 19/022* (2013.01); *G10L 19/038* (2013.01)

(58) Field of Classification Search
CPC ..... G10L 19/022; G10L 19/038; G10L 19/02; G10L 19/025; G10L 19/008; G10L 19/032
See application file for complete search history.

(56) References Cited

PUBLICATIONS

Nakatoh, Yoshihisa, et al. "Low bit rate coding for speech and audio using mel linear predictive coding (MLPC) analysis." ICSLP. 1998. (Year: 1998).*

Cuadra, Patricio de la et al. "Perceptual Audio Coder using Window Switching". Mar. 2000. (Year: 2000).*

European Patent Application No. 24178003.0; Extended Search Report; dated Sep. 16, 2024; 6 pages.

"Information technology—Coding of audio-visual objects—Part 3: Audio"; ISO/IEC 14496-3; International Standard; 4th Edition; Sep. 2009; 1416 pages.

Nakatoh et al.; "Low Bit Rate Coding for Speech and Audio Using Mel Linear Predictive Coding (MLPC) Analysis"; 5th Int'l Conf. on Spoken Language Processing 1998; 4 pages.

Cuadra et al., Perceptual Audio Coder using Window Switching, MUS422/EE367C, Perceptual Audio Coding, Mar. 2000, downloaded from the internet at https://ccrma.stanford.edu/~pdelac/422/project/report.html.

* cited by examiner

*Primary Examiner* — Anne L Thomas-Homescu
(74) *Attorney, Agent, or Firm* — BakerHostetler

(57) ABSTRACT

Aspects of the present disclosure provide improved techniques for coding audio signal with a transient audio sound. Improved techniques include parsing a frame of predetermined length of audio samples into a series of windows of a smaller size, and transforming the windows of time-domain samples into a series of windows of frequency-domain samples. The frequency-domain samples may be organized according to an alignment pattern and may be coded with respect to an envelope of the organized frequency-domain samples.

21 Claims, 9 Drawing Sheets

100

200

300

400

500

600

700

800

900

1000

1100

1200

1300

1400

EFFICIENT CODING OF TRANSIENTS IN TRANSFORM-DOMAIN

CLAIMS FOR PRIORITY

The present disclosure benefits from priority conferred by application Ser. No. 63/505,838, filed Jun. 2, 2023, entitled "Efficient Coding Of Transients In Transform-Domain" the disclosures of which are incorporated herein in their entireties.

TECHNICAL FIELD

The present description relates generally to digital audio coding.

BACKGROUND

Digital audio encoding often includes transforming frames of time-domain audio samples into a block of frequency-domain samples, and then quantizing the frequency domain samples.

In frequency domain coding, transients often result in perceptible quantization noise due to lack of temporal masking. For example, a percussive sound followed by silence or silence followed by the onset of a voice results in transients that frequency domain coding does not code well. When frequency modeling is applied to such transients in bandwidth-constrained coding applications, frequency models often move signal energy to portions of an audio signal that should be silent, which can lead to a perception of distortion on behalf of a human listener. These artifacts often are characterized as "pre-echo" artifacts.

To mitigate such artifacts, two techniques are popular in audio coding. First, an audio coder that performs its frequency transforms on frames of audio content may employ shorter transform windows when transients occur than when transients are not present. Second, an audio coder may employ temporal noise shaping (TNS). Both techniques, however, increase the number of bits used to code audio content, which may make them inapplicable for bandwidth-constrained coding applications.

BRIEF DESCRIPTION OF THE DRAWINGS

Certain features of the present disclosure are set forth in the appended claims. However, for the purpose of explanation, several implementations of the present disclosure are set forth in the following figures.

DETAILED DESCRIPTION

Figure 1:
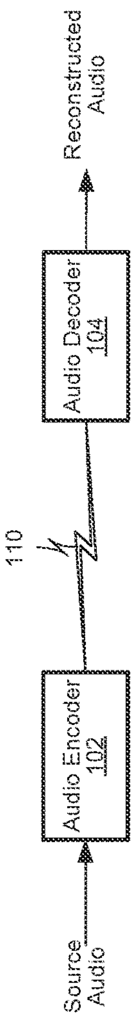
FIG. 1 illustrates an example coding system.

The detailed description set forth below is intended as a description of various configurations of the present disclosure and is not intended to represent the only configurations in which the present disclosure can be practiced. The appended drawings are incorporated herein and constitute a part of the detailed description. The detailed description includes specific details for the purpose of providing a thorough understanding of the present disclosure. However, the present disclosure is not limited to the specific details set forth herein and can be practiced using one or more other implementations. In one or more implementations, structures and components are shown in block diagram form in order to avoid obscuring the concepts of the present disclosure.

Improved techniques for coding an audio signal with a transient audio sound include parsing a frame of predetermined length of audio samples into a series of windows of a smaller size, and transforming the windows of time-domain samples into a series of windows of frequency-domain samples. In a first aspect, the frequency-domain samples may be organized according to an alignment pattern, and the frequency domain samples may be coded with respect to an envelope of the organized frequency-domain samples. In a second aspect, coding of the frequency-domain samples may include vector quantization of vectors formed of frequency-domain samples selected from across the frame.

In some implementations of improved audio transient coding, a frame of audio samples may be coded with respect to an envelope of the frequency-domain samples arranged according to an alignment pattern that traverses multiple windows of the frame. The alignment pattern may include placing a lowest-frequency coefficient of one window adjacent to a lowest frequency coefficient of its neighboring window and also placing a highest frequency coefficient of another window adjacent to a highest-frequency coefficient of its neighboring window. A first version of the alignment pattern may include sequentially concatenating the windows of frequency coefficients, where the frequency coefficients are ordered, such as by sorting, within each window according to their corresponding frequency, and a direction of the ordering reverses between neighboring windows in the concatenation. For example, a first window may sort frequencies from low to high, the next window may sort from high to low, then low to high, and continuing in with alternating sort order. A second version of the alignment pattern may include sorting the frequency coefficient by frequency across an entire frame. For example, the lowest frequency coefficient from all windows in the frame may be grouped and followed by the second-lowest frequency coefficient from all windows. In an aspect, the first version of the alignment pattern may be used for frame with a strong transient, while the second version of the alignment pattern may be used for frames with a weaker transient. In another aspect, estimation of an envelope of frequency coefficients organized according to such alignment patterns may be improved, such as by modeling the envelope with a linear prediction.

In other implementations of improved audio transient coding, the frequency coefficients may be coded with vector quantization, where the vectors are formed by selecting frequency coefficients from scattered locations across the frame. In a first example, a vector may be formed of non-neighboring or disjoint frequencies of a single window. In second example, a vector may be formed of frequencies from a plurality of different windows in a frame. The formed vectors may be quantized by selecting an entry in a codebook for each vector that minimizes a measure of distortion, and in some aspects, the distortion may be weighted based on human-perceptual weighting of the frequencies in the vector. In an aspect, the vector quantization may be conjugate vector quantization according to a conjugate vector codebook.

FIG. 1 illustrates an example coding system 100. System 100 includes an audio encoder 102 in communication via channel 110 with audio decoder 104. In operation audio encoder 102 may receive a source audio signal of audio sampled over time, which may be a time-domain representation of the audio source. The audio encoder may encode the signal from the audio source into an encoded audio signal, which may be transmitted to audio decoder via communications channel 110. Audio decoder 104 may decode the received encoded audio reconstruct the encoded audio as a decoded time-domain audio signal.

In an aspect, communication channel 110 may include transmitters and receivers and a transmission medium between the transmitters and receiver across which the encoded audio is communicated. In other aspects, the communications channel may include computer storage upon which the encoded audio is stored for communication between the audio encoder 102 and audio decoder 104. In some implementations, both an audio encoder and decoder will be implemented on the same side of communication channel 110, for example to enable two-way (duplex) audio communication.

Figure 2:
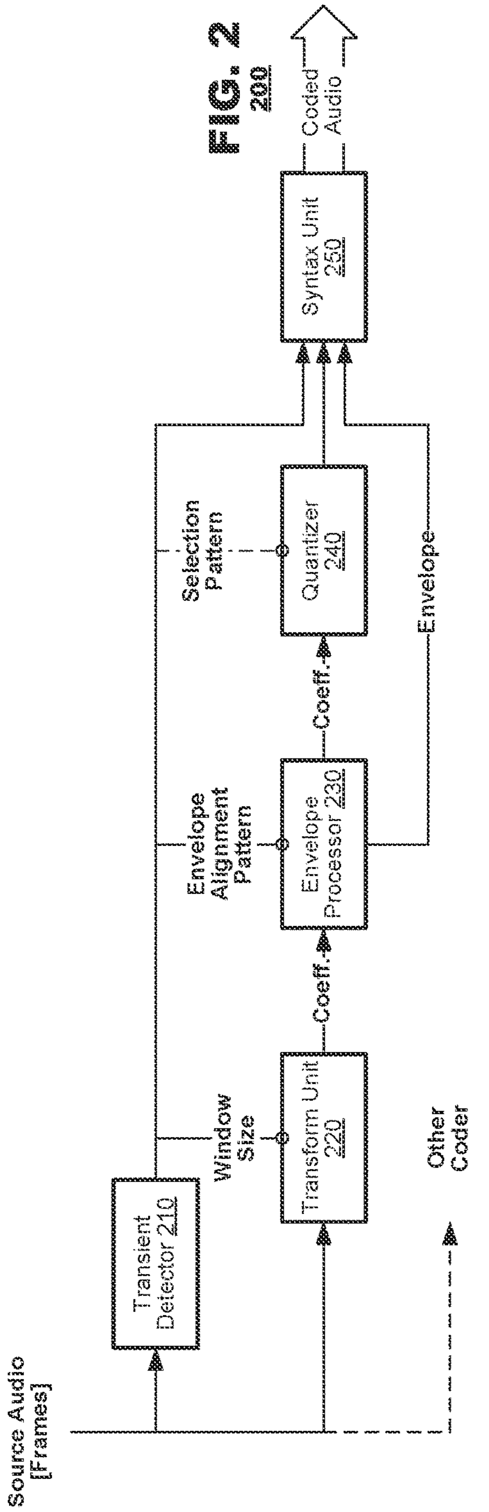
FIG. 2 illustrates an example audio encoding system according to aspects of the present disclosure.

FIG. 2 is a functional block diagram of an audio encoding system 200 according to an aspect of the present disclosure. The system 200 finds application in an audio encoder 102 of FIG. 1. The system 200 may include a transient detector 210, a transform unit 220, an envelope processor 230, a quantizer 240, and a syntax unit 250. The system 200 may operate on source audio that is presented to the system in frames of a predetermined size, for example, 1,024 samples of audio. The system 200 may process the source audio on a frame-by-frame basis.

The transient detector 210 may determine, from an analysis of frame content, whether the frame's content indicates presence of a transient or not. Based on the determination, the transient detector 210 may issue control commands to the other units of the system 200. In a first aspect, the transient detector 210 may issue a control signal to the transform unit 220 that determines a size of a window used by the transform unit 220 as it applies its transform to the input frame of source video. In another aspect, the transient detector 210 may issue a control signal to the envelope processor 230 that determines an alignment pattern used by the envelope processor 230 as it processes transform coefficients output from the transform unit 220. In a further aspect, the transient detector 210 may issue a control signal to the quantizer 240 that defines windows from which the quantizer 240 extracts processed coefficients for quantization. The transient detector 210 also may output its control signals to the syntax unit 250, which may provide representations of those control signals in coded audio data that is output to an audio decoder 102 (FIG. 1).

The transform unit 220 may process audio samples within an input frame and transform them into an alternative domain for processing. Typically, input samples represent the source audio on a time domain basis. The transform unit 220 may convert the time-domain samples of the input frame into a frequency domain representation, for example, as a set of frequency coefficients. As part of this operation, the transform unit 220 may perform a frequency analysis of the samples in the input frame and derive a frequency-based representation of those samples. For example, an overlapped or Modified Discrete Cosine Transform ("MDCT") may be applied to the input frame, or a pseudo-quadrature mirror filter ("PQMF") may be used. In some examples, the transform unit 220 may perform frequency-domain processing based on basis functions that are derived based on a non-uniform frequency scale, e.g., warped frequency transforms such as warped MDCT or warped DCT or a custom non-uniform frequency scale derived from a machine learning (ML) system that minimizes a multi-resolution short-term Fourier transform (STFT) loss function. The multi-resolution STFT loss function in an ML system may estimate a series of error values in a test system relative to a reference system across multiple time-frequency resolutions.

The transform unit 220 may apply its transform at a window size as determined by a control signal output by the transient detector 210. When the transient detector 210 determines, for example, that the input frame does not possess a transient, the transform unit 220 may perform its transform operation across an entire frame. When the transient detector 210 determines that the input frame possesses a transient, the transform unit 220 may partition the input frame into a plurality of smaller units, called "windows" for convenience, and apply its transform separately on each window. The number of windows may be determined from a binary decision output from the transient detector 210 indicating whether a transient is determined to be present or not which causes the transform unit 220 to perform its transform either on an entire frame or on a predetermined number of windows (say, 8 windows). Alternatively, the control signal from the transient detector 210 may identify a number of windows into which a source frame may be partitioned, such as 1, 2, 4, or 8 windows.

The envelope processor 230 may process transform domain coefficients from the transform unit 220 to decorrelate them. Oftentimes, envelope processing involves processing to normalize transform domain coefficient values and to reduce (or eliminate) structure that may be present in the transform domain coefficients that are input to the envelope processor 230. The envelope processor 230 may output the processed coefficients to the quantizer 240 and the envelope representation data to the syntax unit 250. The envelope representation data may identify envelope processing parameter(s) that are applied by the envelope processor 230, which an audio decoder 102 (FIG. 1) may invert during audio decoding. For example, the envelope representation may describe a spectral envelope of the transform domain coefficients that are input to the envelope processor 230; the envelope processor 230 may derive the spectral envelope and then apply it to coefficients during an envelope normalization process.

Operations of the envelope processor 230 may be controlled at least in part by a control signal output from the transient detector 210. When the transient detector 210 determines, for example, that the input frame does not possess a transient, the envelope processor 230 may represent the spectral envelope according to an alignment pattern that extends across the entire frame. When the transient detector 210 determines, however that the input frame possesses a transient, the envelope processor 230 may represent the spectral envelope according to an alignment pattern that arranges transform coefficients from each window in an efficient representation.

The quantizer 240, as its name implies, may apply quantization operations to normalized coefficients output from the envelope processor 230. The quantizer 240 may include, for example, a scalar quantizer, and/or may include a vector quantizer operating according to vector quantization codebook. In the case of vector quantization, vectors may be derived from the normalized coefficients received from the envelope processor 230, which may be selected on a predetermined basis, and the vectors may be normalized and then applied to one or more predetermined codebooks to identify a closest-matching codebook entry to the normalized vector. The codebook entry may be output from the quantizer 240 as a representation of the selected coefficients. The quantizer 240 may repeat the operation for a predetermined number of frame coefficients. In an aspect, the vector quantization may be conjugate vector quantization according to conjugate vector codebooks.

Operations of the quantizer 240 may be controlled at least in part by a control signal output from the transient detector 210. In one aspect, in response to a determination from the transient detector 210 that a transient is detected, the quantizer 240 may alter its selection of coefficients for formation of vectors. For example, the quantizer 240 may select coefficients for each vector according to a selection pattern that ensures coefficients will be selected from two or more windows that are generated by the transform unit 220. Alternatively, the quantizer 240 may select coefficients for each vector according to a disperse selection pattern.

The syntax unit 250 may generate a coded audio signal from the data provided to it from the transient detector 210, the envelope processor 230, and the quantizer 240. For example, the syntax unit 250 may receive data from the transient detector 210 representing a determination whether a transient is present in the source audio frame. The syntax unit 250 may receive data representing the spectral envelope derived by the envelope processor 230. The syntax unit 250 also may receive vectors generated by the quantizer 240 from the normalized coefficients. The syntax unit 250 may integrate the received data into a coded audio signal to be sent to the audio decoder 104 (FIG. 1). Typically, the audio encoder 102 and the audio decoder 104 will operate according to a predetermined coding protocol; the syntax unit 250 may generate a coded audio signal that conforms to the coding protocol. In an aspect, syntax unit 250 may include lossless entropy coding of the quantizer 240 output and/or coding parameters such as the indications of frame envelope, detected transient, window size, envelope alignment pattern, vector selection pattern. In an aspect an indication of a detected transient may imply one or more of the frame envelopes, the window size, the envelope alignment pattern, and the vector selection pattern.

Figure 3:
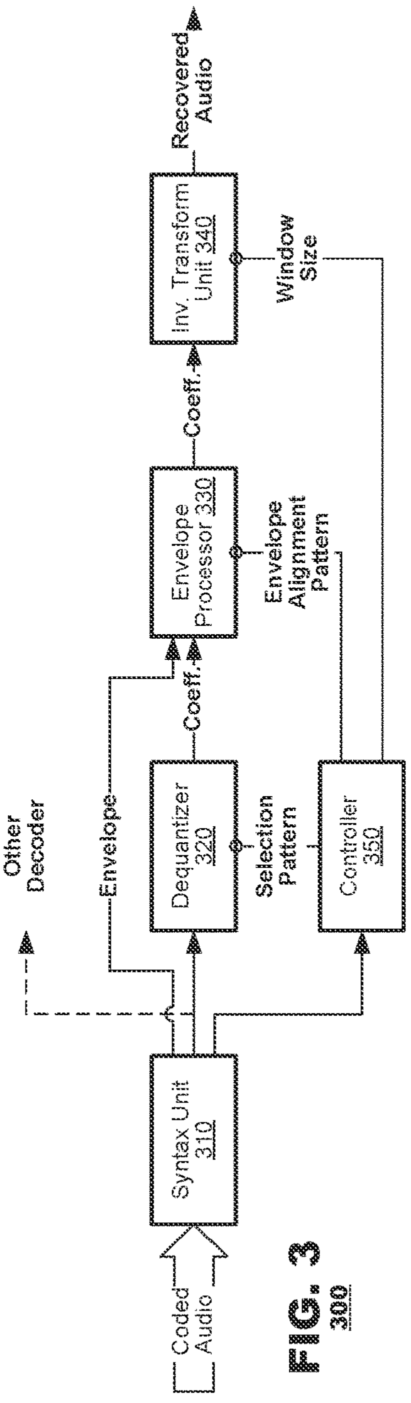
FIG. 3 illustrates an example audio decoding system according to aspects of the present disclosure.

FIG. 3 is a functional block diagram of an audio decoding system 300 according to an aspect of the present disclosure. The system 300 may find application in the audio decoder 104 of FIG. 1. The system 300 may include a syntax unit 310, a dequantizer 320, an envelope processor 330, an inverse transform unit 340, and a controller 350. The dequantizer 320, envelope processor 330, and inverse transform unit 340 may invert coding operations performed by their counterparts (the quantizer 240, the envelope processor 230, and transform unit 220) in the audio coding system 200 of FIG. 2.

The syntax unit 310 may parse individual data elements from the coded audio provided by the audio coding system 200 (FIG. 2) and distribute those data elements to other components within the system 300. Coded audio data may include indications of decoding control data that control a decoding process at a decoder, for example according to a predetermined coding protocol. For example, a transient indicator may be parsed from coded audio and provided to the controller 350, which may output control signals to the dequantizer 320, envelope processor 330, and inverse transform unit 340 to govern their operation.

The dequantizer 320 may invert coding operations applied by the quantizer 240 (FIG. 2). For example, the dequantizer 320 may refer codebook indices generated by the quantizer 240 to its own codebook (not shown) and generate vector data therefrom. The dequantizer 320 may apply vector parameters to frequency coefficients as determined by a selection pattern control signal provided by the controller 350 and, ultimately, the transient processor 210 (FIG. 2). The dequantizer 320 may output sets of coefficients to the envelope processor 330. In an aspect, the vector dequantization may be conjugate vector dequantization with a conjugate vector codebook.

The envelope processor 330 may invert coding operations applied by the envelope processor 230 (FIG. 2). For example, the envelope processor 330 may invert a normalization process performed by the envelope processor 230 according to a spectral envelope provided in the coded audio signal and forwarded by the syntax unit 310 and, ultimately, the transient processor 210 (FIG. 2). Thus, normalized coefficients that are input to the envelope processor 330 may be output to the inverse transform unit 340 as recovered transform coefficients. The normalization inversion may be applied according to an envelope alignment pattern control signal provided by the controller 350.

The inverse transform unit 340 may invert transform processes applied by the transform unit 220. Recovered transform coefficients received from the envelope processor 330 may be transformed from the transform domain into time-domain samples of recovered audio. For example, frequency coefficients, which may be generated by an MDCT process, may be converted from the frequency domain to the time domain. The inverse transform conversion process may operate according to window sizes as determined by a control signal from the controller 350 and, ultimately, the transient processor 210 (FIG. 2).

In another aspect, a frame that is determined by the transient detector 210 not to contain a transient may be coded and decoded by alternate processes (not shown). Thus, frames that do not contain transients may bypass the coding and decoding elements illustrated in FIGS. 2 and 3.

The systems 200 and 300 illustrated in FIGS. 2 and 3 represent elements that are provided to encode and decode frames from a single audio source. Many audio coding applications require coding and decoding audio from multiple audio channels simultaneously. For example, stereo audio applications involve a pair of audio channels representing left channel audio content and right-channel audio content. Other applications such as spatial audio applications require a greater number of channels, for example, five or more. The principles of the present disclosure find application in such audio applications. In such cases, several instances of the systems 200 and 300 may be provided as necessary to support these independent audio sources. The syntax units 250 and 310 of each system 200, 300, may multiplex and demultiplex coded audio from the different instances of the systems 200, 300 in conformance with the coding protocol under which the audio encoder 102 and audio decoder 104 (FIG. 1) operate.

Figure 4:
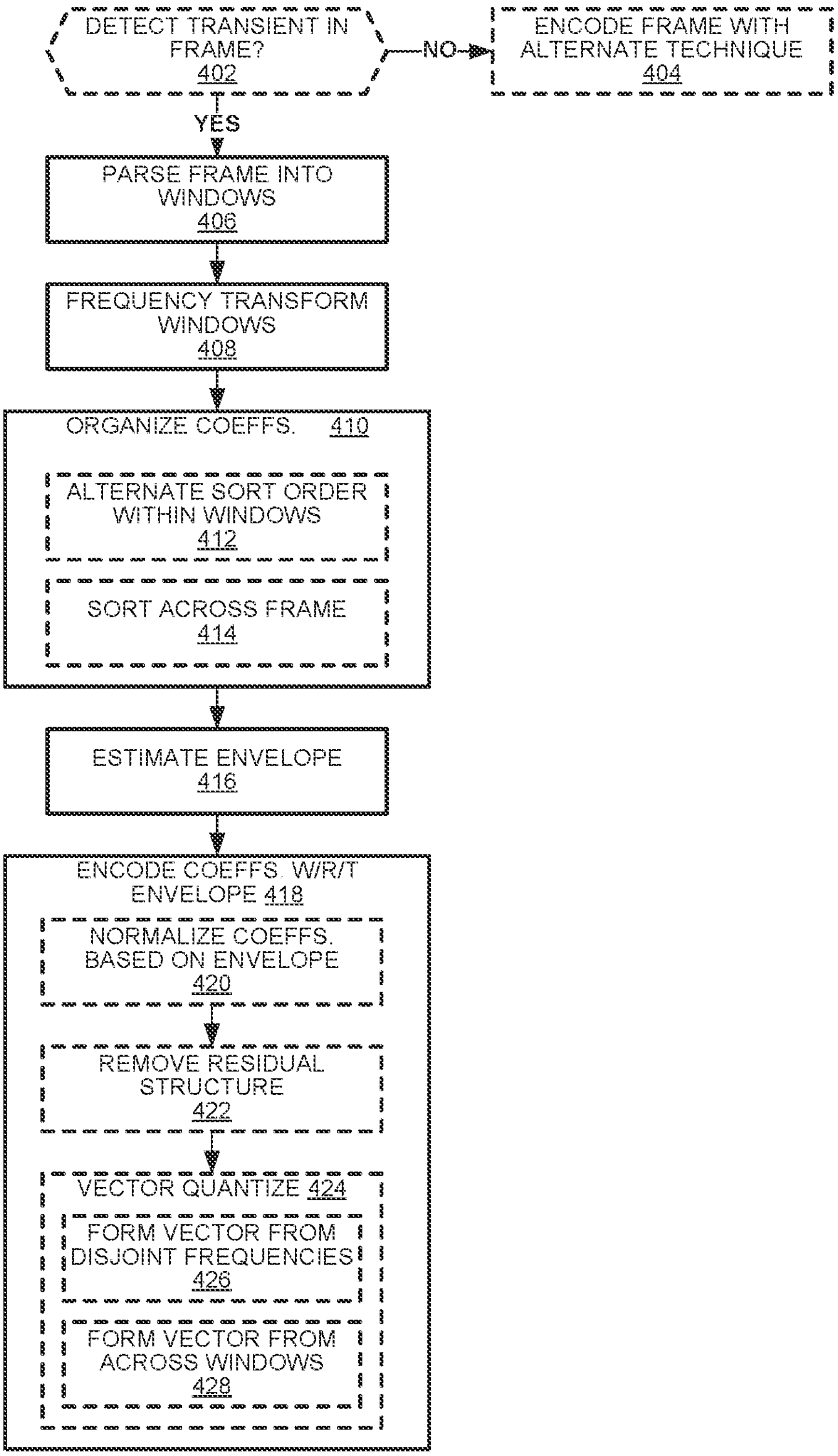
FIG. 4 illustrates an example process for audio encoding according to aspects of the present disclosure.

FIG. 4 illustrates an example process 400 for audio encoding according to aspects of the present disclosure. Process 400 may be implemented by, for example, audio encoder 102 (FIG. 1) or audio encoding system 200 (FIG. 2). Process 400 includes parsing a frame of time-domain audio samples into windows smaller than the frame (box 406). Audio samples of individual windows of the frame are transformed into a frequency-domain separately from other windows of the frame (box 408). The resulting frequency-domain coefficients for the frame are organized according to an alignment pattern (box 410). A frequency envelope may be estimated for the organized coefficients (box 416). The frequency-domain coefficients may be encoded with respect to the estimated frequency envelope into an encoded bitstream (box 418).

In optional aspects of method 400, a transient may be detected in the frame (box 402). When a transient is not detected, the frame may be encoded with an alternate technique (box 404). In an aspect, frequency-domain coefficients of a frame may be organized by an alternating sort order of frequencies within windows (box 412), such as with the first alignment pattern described above. In another aspect, frequency domain coefficients of a frame may be organized by sorting frequencies across windows of the frame (box 414), such as with the second alignment pattern described above.

In some implementations, encoding frequency-domain coefficients with respect to an envelope (box 418) may include normalizing the coefficients based on the estimated envelope (box 410), removing residual structure from the normalized coefficients (box 422), and vector quantizing vectors of the normalized coefficients (box 424). In an aspect, the vectors may be formed from disjoint frequencies within a window of the frame (box 426) or may be formed of coefficients from across windows of the frame (box 428).

Figure 5:
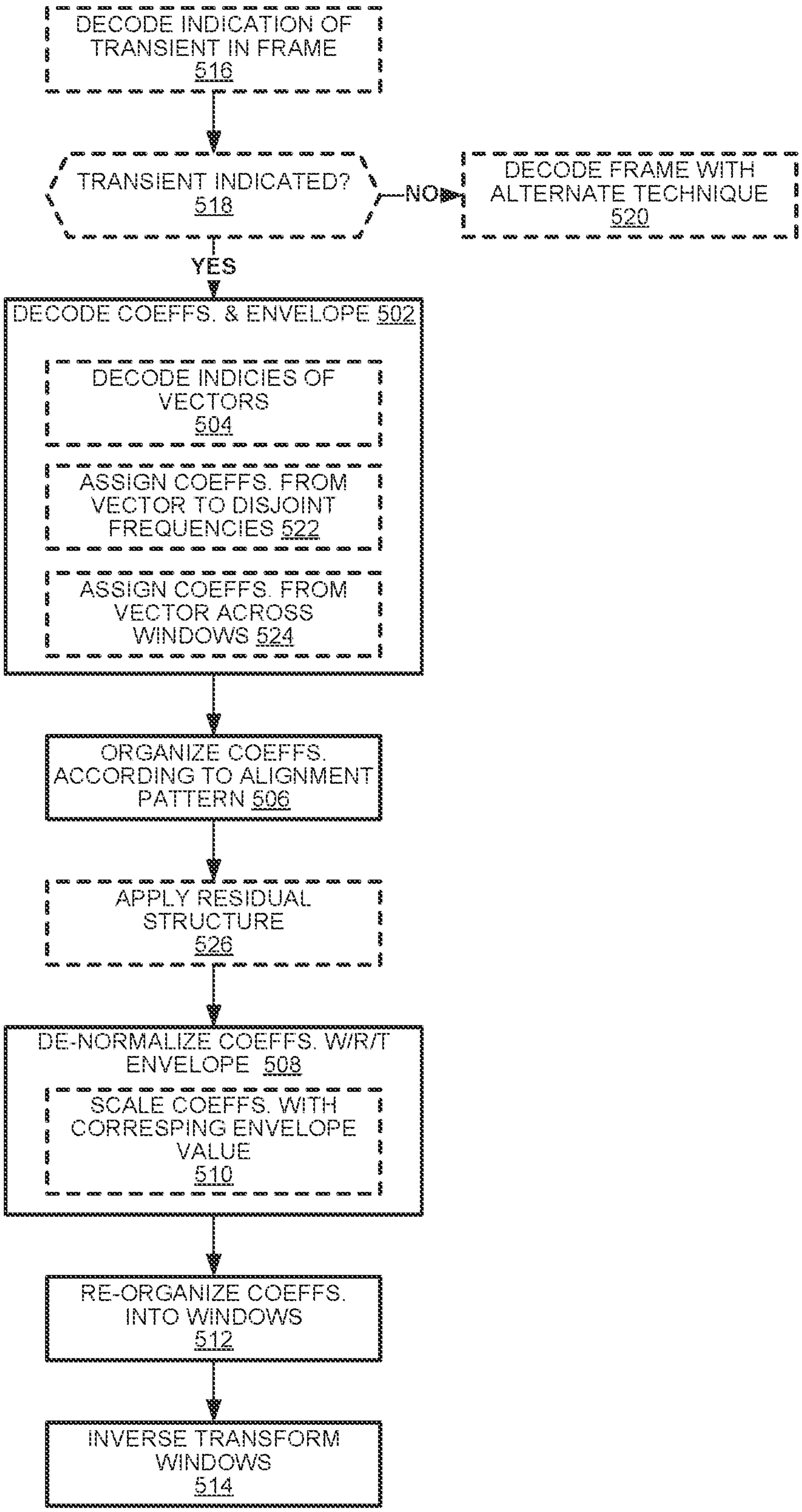
FIG. 5 illustrates an example process for audio decoding according to aspects of the present disclosure.

FIG. 5 illustrates an example process 500 for audio decoding according to aspects of the present disclosure. Process 500 may be implemented by, for example, audio decoder 104 (FIG. 1) or audio decoding system 300 (FIG. 3). Process 500 includes decoding, from an encoded bitstream, frequency-domain coefficients and an indication of a frequency envelope (box 502). The coefficients are organized according to an alignment pattern for the indicated frequency envelope (box 506), such as the first or second alignment patterns described above. The organized coefficients are then de-normalized with respect to the indicated frequency envelope (box 508). De-normalized frequency-domain coefficients are then re-organized into the windows (box 512), and the windows of frequency-domain coefficients are inverse frequency transformed into reconstructed time-domain audio samples.

In some optional aspects, a decoder may parse indications of decoding control data from the encoded bitstream, and subsequent decoding operations may be controlled by the decoding control data. For example, a decoder may parse an indication of a transient in an audio frame (516). When a transient is indicated for a frame (518), decoding continues with box 502; otherwise, when a transient is not indicated for the frame, the frame is decoded with an alternate technique (520). In another example, a decoder may parse an indication of residual structure in a frame of frequency coefficients. A decoder may apply the residual restructure to frequency coefficient (526) prior to de-normalization in box 508.

In other optional aspects, frequency coefficients were quantized with a vector quantizer, decoding the coefficients (504) may include decoding indices of the vectors (504), assigning the coefficients from a vector to disjoint frequencies within a window (522), and/or assigning the coefficients from a vector to frequencies of different windows across a frame (524). In another optional aspect, de-normalizing coefficients (508) may include scaling coefficients of a frame with each coefficient's corresponding envelope value (510).

Figure 6:
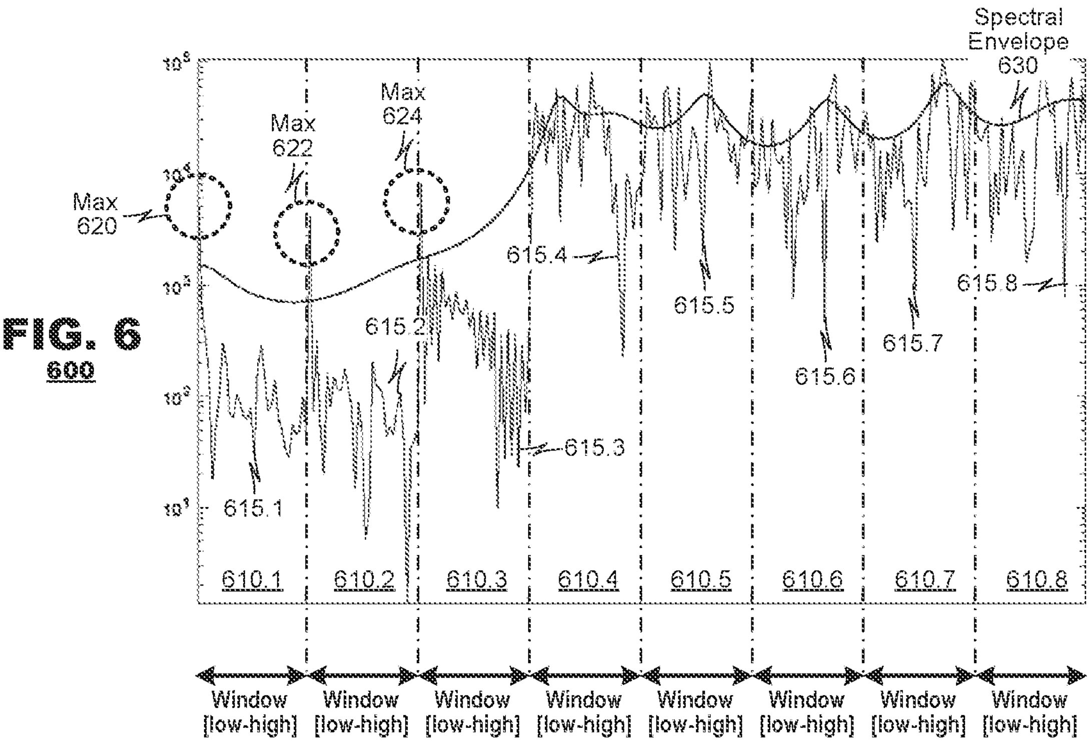
FIG. 6 illustrates an example organization of frequency coefficients according to aspects of the present disclosure.

FIG. 6 depicts an exemplary organization of frequency-domain coefficients of a frame 600 that may be output by a transform unit 220 (FIG. 2) prior to application of an envelope alignment pattern by an envelope processor 230. In this example, a determination that a frame contains a transient causes a frame 600 to be partitioned into eight windows 610.1-610.8. Application of the transform may cause each window 610.1, 610.2, . . . , 610.8 to be occupied by respective frequency coefficients 615.1, 615.2, . . . , 615.8 representing the audio content of the frame 600 within the respective window 610.1, 610.2, . . . , 610.8. Within each window 610.1, 610.2, . . . , 610.8, the transform process typically arranges the coefficients in order from the lowest frequency coefficient to the highest frequency (shown as "low-high").

The example of FIG. 6 relates to a frame 600 in which a transient occurs temporally around windows 610.3 and 610.4. The frequency domain coefficients of windows 610.1 and 610.2 have relatively low magnitudes, they increase in window 610.3, and they are at their largest values throughout windows 610.4-610.8. This may occur in a frame that has low amplitude time-domain samples (e.g., silence) in windows 610.1 and 610.2 followed by some element audio content. In a bandwidth-limited coding application, where an audio coder is constrained in the number of bits that can be allocated to represent a spectral envelope 630 of the windows' coefficients, a coder may develop a representation of spectral envelope 630 that is insufficient to represent all frequency domain coefficients in the frame. In the example of FIG. 6, for example, the spectral envelope 630 does not include all frequency domain coefficients from all the windows 610.1-610.8. In particular, the spectral envelope 630 does not cover frequency coefficient values within windows 610.1, 610.2, and 610.3 at the lowest frequency coefficient positions (labeled max 620, 622, 624). Frequency coefficients that do not fall under the spectral envelope 630 will not be modeled well by spectral envelope 630, and hence may exhibit distortion upon decoding. And, because the frequency coefficient values at the lowest frequency coefficient positions 620, 622, 624 of windows 610.1, 610.2, and 610.3 likely will be coded with distortion, this may lead to pre-echo artifacts and possible perceptual distortion if the frame 600 were coded and decoded with reference to the spectral envelope 630.

Figure 7:
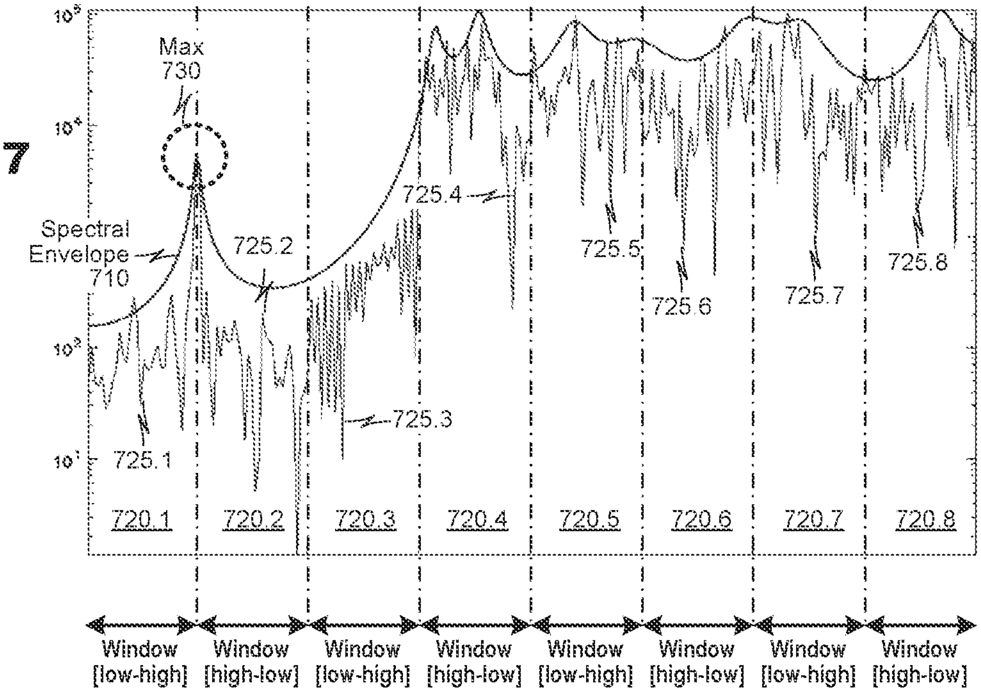
FIG. 7 illustrates an example organization of frequency coefficients according to aspects of the present disclosure.

FIG. 7 depicts an exemplary organization of frequency-domain coefficients of frame 700 when a spectral envelope 710 is generated according to an envelope alignment pattern. Frame 700 may be a reorganization of the coefficients in frame 600 (FIG. 6). In frame 700, the frame 700 is partitioned into a plurality of windows 720.1-720.8 as in FIG. 6. The frequency coefficients 725.1, 725.2, . . . , 725.8 of the windows 720.1, 720.2, . . . , 720.8 are rearranged as compared to FIG. 6 by altering the order in which they appear in the representation of the spectral envelope 710. As illustrated in FIG. 7, the envelope alignment pattern positions highest frequency coefficients in one window (say 720.2) to be adjacent to the highest frequency coefficients in a neighboring window 720.1. Similarly, the illustrated envelope alignment pattern positions lowest frequency coefficients in one window (again, 720.2) to be adjacent to the lowest frequency coefficients in the next window 720.3. This alignment pattern may repeat across all windows 720.1-720.8 in the frame 700, placing highest frequency coefficients of adjacent windows adjacent to each other and placing lowest frequency coefficients of adjacent windows adjacent to each other. Organization of coefficients according to this envelope alignment pattern may allow for a more simplified representation of the frame's spectral envelope 710, which can lead to conservation of the number of bits required to represent the spectral envelope 710. As can be seen by comparison of FIGS. 6 and 7, spectral envelope 710 can represent the frequency coefficients of windows 720.1-720.3 with a single local maximum 730, rather than the three local maxima 620, 622, 624 shown in FIG. 6. In this manner, the spectral envelope 710 can be represented more efficiently in a coded bitstream than could be the spectral envelope 630 of the FIG. 6.

Figure 8:
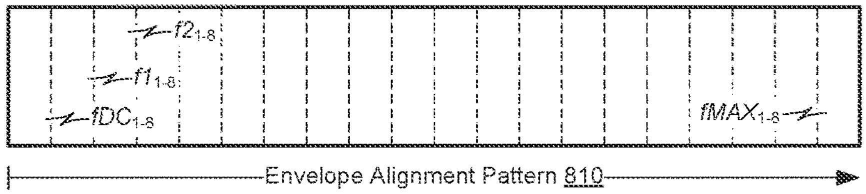
FIG. 8 illustrates an envelope alignment pattern according to aspects of the present disclosure.

FIG. 8 illustrates a second envelope alignment pattern for an exemplary frame 800 according to an aspect of the present disclosure. As illustrated in FIG. 8, the envelope alignment pattern 810 may consider the frequency coefficients from among a plurality of windows (say windows 610.1-610.8 in FIG. 6) in an order that effectively sorts the frequency-domain coefficients by frequency across an entire frame. For example, as illustrated in FIG. 8, the lowest frequency coefficient from among the eight windows (often called the DC coefficient) may be scanned sequentially (shown as $fDC_{1-8}$) before scanning the next-lowest frequency components ($f1_{1-8}$) from among the windows 610.1-610.8. The envelope alignment pattern 810 may advance to increasingly higher frequency positions, scanning the frequency coefficient from all the windows sequentially, until the envelope alignment pattern reaches and scans the highest frequency coefficients ($fMAX_{1-8}$). It is expected that, when a spectral envelope (not shown) is derived from frequency components of multiple windows 610.1-610.8 (FIG. 6) according to envelope alignment pattern 810 illustrated in FIG. 8, the spectral envelope can be represented more efficiently than would a spectral envelope 600 according to a scan pattern as illustrated in FIG. 6.

In an aspect, the system 200 may vary selection of envelope alignment patterns according to strength of transient determinations made by the transient detector 210 (FIG. 1). For example, when a transient detector 210 determines that a transient is identified with a probability that exceeds a predetermined threshold, the envelope alignment pattern illustrated in FIG. 7 may be applied, but, when a transient detector 210 determines that a transient is identified with a probability that is lower than the threshold, the envelope alignment pattern illustrated in FIG. 8 may be applied. And, of course, when a transient detector 210 determines that no transient is present in a frame, identified with a high probability, the envelope processor 230 (FIG. 2) may represent the spectral envelope according to a scan direction that proceeds across the frame's frequency coefficients in a default direction, for example, from the lone DC coefficient of the frame to the highest-frequency coefficient.

In an aspect, the envelope processor 230 (FIG. 2) may provide a representation of the spectral envelope that traverses all frequency coefficients of a frame, regardless of whether the frame is partitioned into multiple windows as in FIGS. 7 and 8 or not. In this aspect, the envelope processors 230 (FIG. 2) and 330 (FIG. 3) determine an envelope alignment pattern for frames with reference to window partitions that may be present, but it may encode a representation of the spectral envelope on a granularity of a frame. It is expected that, by defining the spectral envelope on a frame granularity rather than on a window granularity (which would require multiple definitions of spectral envelopes due to the presence of multiple windows), the proposed technique leads to improved coding efficiencies in audio coding.

Figure 9:
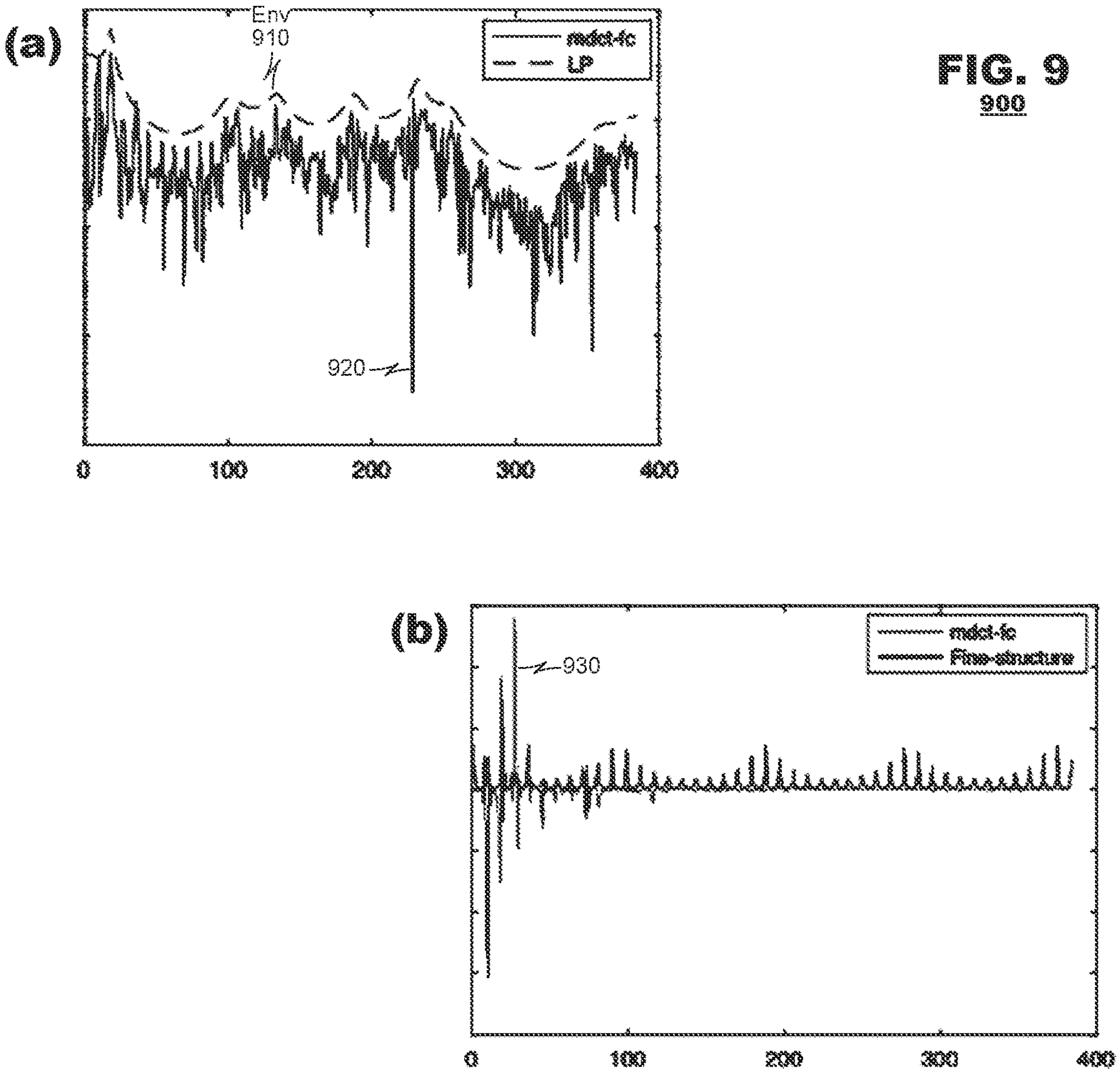
FIG. 9 illustrates operation of envelope normalization according to an aspect of the present disclosure. Specifically, FIG. 9(*a*) illustrates a relationship between a spectral envelope and coefficients prior to normalization and FIG. 9(*b*) illustrates the coefficients after application of a normalization operation according to the spectral envelope.

As discussed, an envelope processor 230 may perform coefficient normalization using a spectral envelope that is derived for a frame. FIG. 9 illustrates operation of envelope normalization according to an aspect of the present disclosure as applied to an exemplary frame 900 of frequency coefficients. The envelope processor 230 may scale frequency coefficients 920 of the frame 900 by dividing a coefficient value at each coefficient position by the value of the spectral envelope 910 at that same position. Each normalized coefficient will take a value between −1 and 1 following the normalization operation. FIG. 9(*a*) shows the log magnitude MDCT frequency spectrum and an example spectral envelope to perform the normalization operation. FIG. 9(*b*) illustrates normalized coefficient values 930 that may be obtained from the coefficient values 920 and spectral envelope 910 of FIG. 9(*a*). In an aspect, the normalized coefficients values 930 may further be processed to remove any remaining residual structure present in the spectrum after normalization. For example, a second-stage de-correlator, such as residual structure remover 1214, may remove the periodic, fine structure depicted in FIG. 9(*b*). Additional details are provided below regarding FIG. 12 and spectrum modeler 1250, including a spectrum reorganizer 1206, an envelope normalizer 1210, an envelope estimator 1212, and a residual structure remover 1214.

Figure 10:
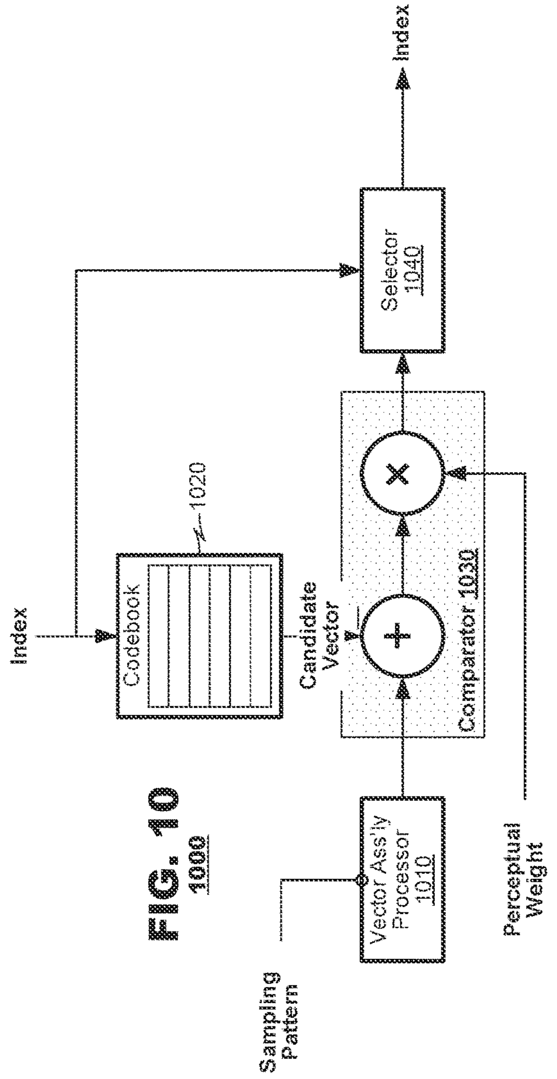
FIG. 10 illustrates an example quantizer according to aspects of the present disclosure.

FIG. 10 is a functional block diagram of a quantizer 1000 according to an aspect of the present disclosure. As illustrated in FIG. 10, the quantizer 1000 is based on a vector quantizer. The quantizer 1000 may include a vector assembly processor 1010, a codebook 1020, a comparator 1030, and a selector 1040. The vector assembly processor 1010 may extract coefficients from a frame's normalized coefficients as generated by the envelope processor 230 (FIG. 2) according to a sampling pattern and form a vector therefrom. For each vector, the comparator 1030 may compare the vector to candidate vectors stored in the codebook 1020 to determine a coding error that would arise if the candidate vector were selected to represent the input vector. A selector 1040 may select the candidate vector that minimizes coding distorting for the input vector and outputs a codebook index representing the selected candite vector.

In an aspect, quantizer 100 may select an index to represent a vector based on a perceptual weighting of frequencies of the coefficients forming the vector. For example, comparator 1030 may determine a distortion for a candidate vector by subtracting the element values in the candidate vector from corresponding element values in a vector to be quantized from vector assembly processor 1010. The resulting differences between vector elements may be weighted based on a perceptual value of the corresponding frequency represented by the coefficient vector elements in the vector to be quantized. The weighted differences between vector elements may then be combined as a distortion measure for the candidate vector, such as with a mean-squared-error (MSE) or mean-absolute-error metric. The distortion measures for each corresponding candidate vector may then be compared to select an index to represent the vector being quantized.

The quantizer 10000 may repeat its operation on a plurality of input vectors selected from frame coefficients until a predetermined number of vectors have been generated from the frame or until the frame coefficients are exhausted.

Figure 11:
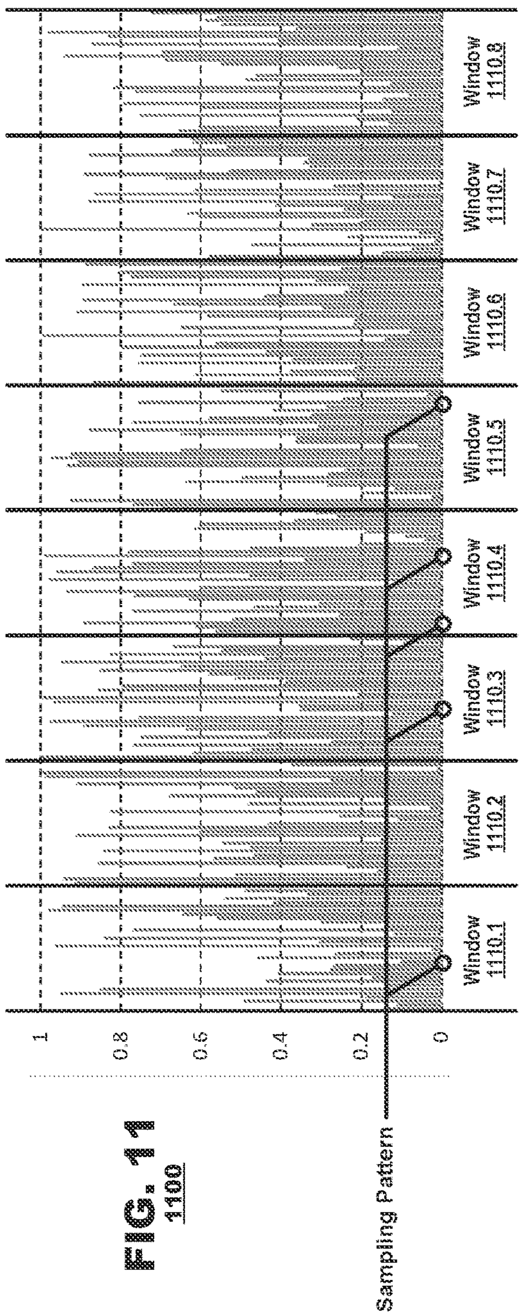
FIG. 11 illustrates an example vector sampling pattern according to aspects of the present disclosure.

As discussed, the vector assembly processor 1010 may extract coefficients from a frame of normalized coefficients as determined by a sampling pattern. In an aspect, the sampling pattern may be provided to the quantizer 1000 from a transient detector 210 (FIG. 2). In one aspect, shown in exemplary form in FIG. 11, the sampling pattern may be defined to ensure that a candidate vector is formed from coefficients of multiple windows as generated by the transform. FIG. 11 illustrates an exemplary frame 1100 of normalized coefficients shown as partitioned into eight windows 1110.1-1110.8. In this example, the sampling pattern forms a candidate vector from windows 1110.1, 1110.3, 1110.4, and 1110.5. For an n-dimensional candidate vector, the quantizer 1000 (FIG. 10) would select n coefficients from an input frame 1100. By selecting coefficients from multiple windows 1110.1, 1110.2, . . . , 1110.8, it is expected that any coding error that arises from quantization of a vector generated therefrom will be distributed across the relevant windows. Again, the quantizer 1000 may repeat its operation over multiple candidate vectors, each of which may be selected according to a sampling pattern.

In a second aspect, quantizer 1000 input vectors may be formed by collecting frequency-domain coefficients from a dispersed set of frequencies within a single window such as 1110.1. In this second example, the sampling pattern may select non-neighboring frequency coefficient positions from among the coefficients within the single window 1110.1.

Figure 12:
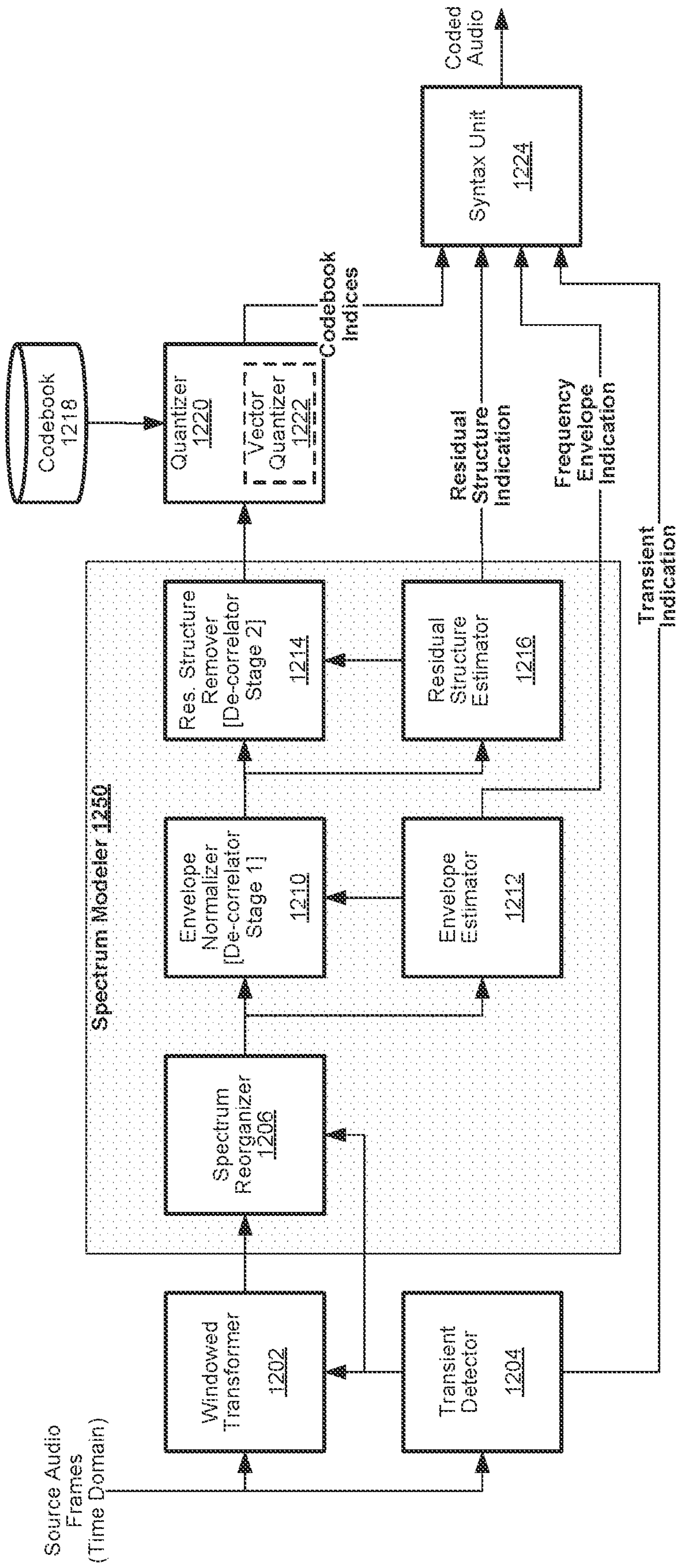
FIG. 12 illustrates an example audio encoding system according to aspects of the present disclosure.

FIG. 12 illustrates an example audio encoding system 1200 according to aspects of the present disclosure. The system 1200 may be an example of an audio encoder 102 (FIG. 1). System 1200 includes a windowed transformer 1202, a transient detector 1204, a spectrum modeler 1250 (including a spectrum reorganizer 1206, an envelope normalizer 1210, an envelope estimator 1212, and a residual structure remover 1214), a residual structure estimator 1216, a quantizer codebook 1218, a quantizer 1220, and a syntax generator 1224.

In operation, source audio may be provided as a time-domain signal of audio samples. Source audio typically is organized into "frames," units of a predetermined number of samples such as 1,024 samples. When the audio is represented with a fixed sampling rate (e.g., 48 kHz or 48,000 samples/second), each frame represents the source audio's content over a predetermined temporal duration.

The transient detector 1204 may detect, from content of a frame, whether a transient sound occurs during the frame. In an aspect, transient detector 1204 may determine a strength of a transient within the frame or probability of that a transient exists in the frame. Transient detector 1204 may provide an indication of a transient, for example, as a Boolean value (either a transient was detected or not in the frame), as a strength of a detected transient in the frame, or a probability that a transient exists in the frame. When the transient detector 1204 determines that a transient has occurred, it may generate a control signal to the windowed transformer.

The windowed transformer 1202 may partition an input frame into a plurality of windows when it receives a control signal from the transient detector 1204 indicating presence of a transient in the frame. The windowed transformer 1202 also may transform time-domain audio samples within each window into a set of frequency-domain coefficients, for example, using a MDCT.

In an aspect, the number of windows generated by the windowed transformer 1202 may vary based on the content provided by the transient detector 1204 control signal. For example, if no transient is detected, windowed transformer 1202 may avoid partitioning; the windowed transformer 1202 may transform the frame of source audio with single MDCT as a unit. Alternately, if a transient is detected by transient detector 1204, windowed transformer 1202 may separately transform windows of the frame with a window width less than the frame length. The MDCT may generate sets of frequency-domain coefficients, one set per partitioning window, representing the audio content contained within the respective partitioning window.

The spectrum reorganizer 1206 may sort the frequency-domain coefficients of each frame according to an alignment pattern. Reorganization in an alignment pattern may improve efficiency of envelope representations performed by later stages of the system 100. The alignment pattern may sort the frequency-coefficients according to their corresponding frequency.

A first alignment pattern, as described above, may include sequentially concatenating the windows of frequency coefficients, where the frequency coefficients are sorted within each window according to their corresponding frequency, and the order of the sort reverses between neighboring windows in the concatenation. Frequency coefficients within each window will contain coefficient values for each of a number of frequencies between a DC frequency and a maximum frequency generated by the windowed transformer 1202; the first alignment pattern may relocate like kind coefficients adjacent to each other at the boundaries between adjacent windows (e.g., a DC coefficient of one window will be placed adjacent to a DC coefficient of another window and a highest-frequency coefficient of a window will be placed adjacent to a highest-frequency coefficient of a neighboring window) when considered along a scan direction of an envelope representation. An example of organizing according to the first alignment pattern is described below with reference to FIGS. 6 and 7.

The envelope estimator 1212 may estimate an envelope for a whole frame of frequency-domain coefficients organized according to an alignment pattern. The envelope estimator 1212 may generate output data, shown as a frequency envelope indication, which is placed into the coded audio bitstream and transmitted to the audio decoder 104 (FIG. 1). In an aspect, an envelope may be modeled with linear prediction analysis along the organized coefficients; the envelope estimator 1212 may estimate parameters of the linear prediction model and provide an indication of the frequency envelope as the estimated parameters of the linear model.

The envelope normalizer 1210 may generate a normalized representation of the frequency-domain coefficients based on the frequency envelope indication generated by the envelope estimator 1212. For example, the envelope normalizer 1210 may divide each frequency coefficient by that coefficient's corresponding value in the frequency envelope indication.

The residual structure estimator 1216 may identify any residual structure remaining in the sequence of frequency domain coefficient after normalizing them based on the envelope, and residual structure remover may remove the identified residual structure from the normalized frequency-domain coefficients. For example, residual structure may be modeled as periodic characteristics remaining in the values along the normalized coefficients. The residual structure estimator 1216 estimate parameters of the periodic characteristics model and provide an indication of the residual structure as the estimated parameters of the periodic characteristics model.

In an aspect, the normalizer 1210 may act as a first stage of de-correlating the sequence of frequency-domain coefficients, and then structure remover 1214 may act as a second stage of de-correlating the sequency of frequency-domain coefficients. Some quantizers, including vector quantizers, may operate more effectively when the sequential inputs to the quantizer are de-correlated from each other.

The quantizer 1220 may quantize de-correlated frequency domain coefficients. In some implementations, quantizer 1220 may include a vector quantizer 1222 that quantizes vectors of de-correlated frequency coefficients according to a vector codebook 1218 to produce an index of a codeword in the codebook for each vector input to quantizer 1220. In aspect, quantizer 1220 may combine multiple types of quantizers. For example, quantizer 1220 may use a (uniform or non-uniform) scalar quantizer to quantize lower-frequency coefficients and also use a vector quantizer to quantize higher frequency coefficients. In another aspect, codebook 1218 may include multiple codebooks, such as conjugate vector codebooks.

In aspects, the vectors may be formed by collecting disjoint frequency coefficients from the sequence of frequency samples of the frame. In a first example, the vectors may be formed by collecting frequency-domain coefficients from a plurality of windows into each vector. In a second example, vectors may be formed by collecting frequency-domain coefficients from a dispersed set of frequencies within a single window. In this second example, the vectors may include only non-neighboring frequencies.

The syntax generator 1224 may integrate the input data received from other processing elements in the system 1200 into a coded bitstream to send to the audio decoder 100. For example, the syntax generator 1224 may receive frame codebook indices from the quantizer 1220 indications of a detected transient from the transient detector 1204, a frequency envelope indication from the envelope estimator 1212, a residual structure estimation from the residual structure estimator 1216. The syntax generator 1224 may integrate these data elements into a coded representation of the frame according to a syntax of a coding protocol utilized between the audio encoder 102 and the audio decoder 104 (FIG. 1). In some implementations, the syntax generator 1224 may provide a representation of a codebook 1218 in the coded bitstream. However, codebook 1218 may not be replicated in every coded frame.

Figure 13:
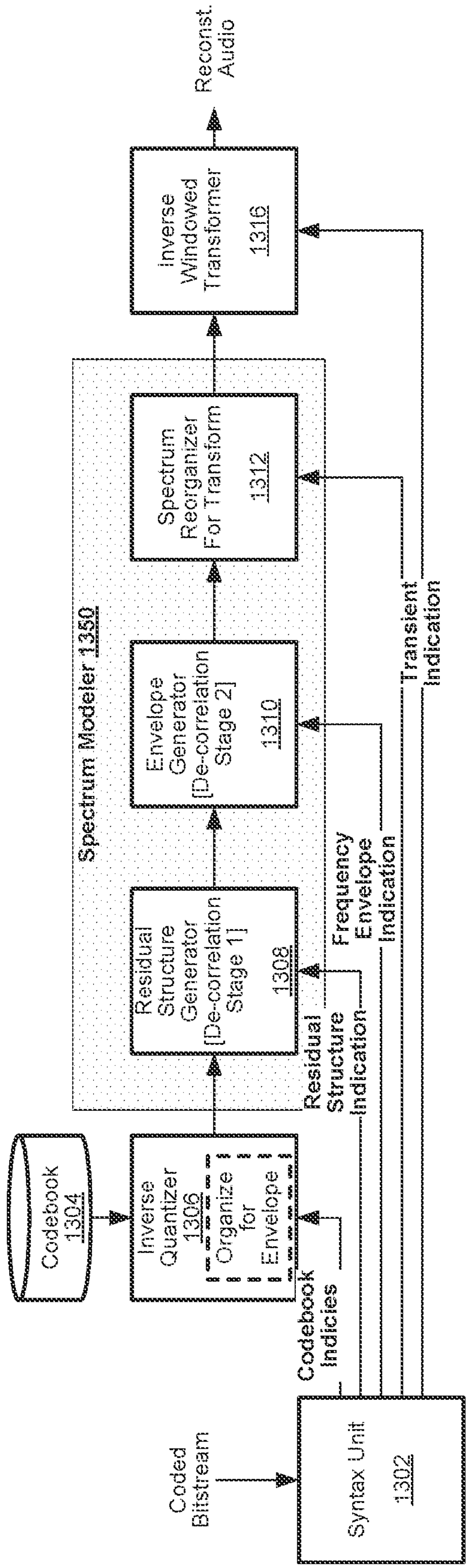
FIG. 13 illustrates an example audio decoding system according to aspects of the present disclosure.

FIG. 13 illustrates an example audio decoding system 1300 according to aspects of the present disclosure. The system 1300 may be an example of audio decoder 104 (FIG. 1). System 1300 may include a syntax unit 1302, a codebook 1304, an inverse quantizer 1306, a spectrum modeler 1350 (including a residual structure generator 1308, an envelope generator 1310, and a spectrum reorganizer 1312), and an inverse transformer 1316.

In operation, the decoding system 1300 may invert many of the operations of encoding system 1200 (FIG. 12). The syntax unit 1302 may parse a coded bitstream for a frame to produce codebook indices and an indication for the frame of the residual structure, the frequency envelope, and any detected transient. Inverse quantizer 1306 may invert quantization (as may be performed by quantizer 1220 (FIG. 12)), for example, by outputting a vector codeword of normalized frequency-domain coefficients for each input codebook index into codebook 1304. Codebook 1304 may be based on, or identical, to encoding codebook 1218 (FIG. 12). In an aspect, the resulting frequency-domain coefficients may be organized according to indicated frequency envelope, such as organization according to the first or second alignment pattern described above. Residual structure generator 1308 may generate the indicated residual structure and apply or add the residual structure to the normalized frequency-domain coefficients. For example, the residual structure may be generated based on a periodic characteristics model, as with residual structure estimator 1216 (FIG. 12). Envelope generator 1310 may generate the indicated envelope and may de-normalize the normalized frequency-domain coefficients by applying the envelope to the normalized coefficients. For example, Envelope generator 1310 may multiply each normalized coefficient by its corresponding envelope value to produce a de-normalized frequency-domain coefficient. The de-normalized coefficients may by reorganized by spectrum reorganizer 1312 for an inverse frequency transform. Inverse windowed transformer 1316 may apply a windowed inverse frequency transform, such as an inverse MDCT. In an aspect, the size of window used by transformer 1316 the organization used in reorganizer 1312 may be based on the transient indication.

Figure 14:
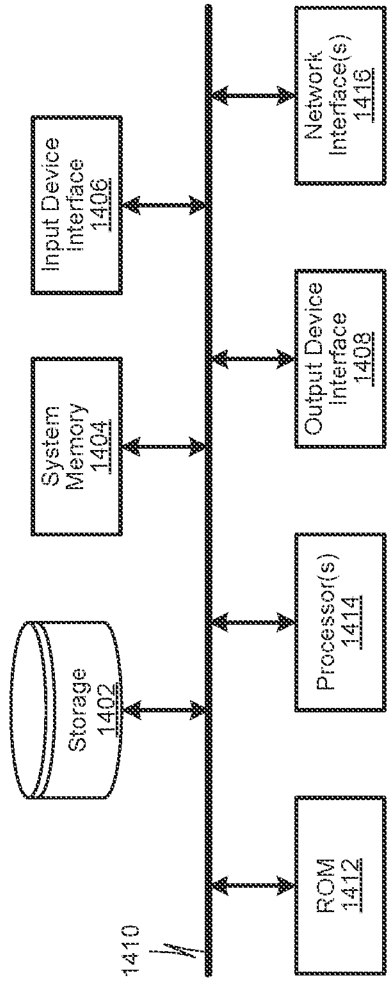
FIG. 14 illustrates an example computing device with which aspects of the present disclosure may be implemented.

FIG. 14 illustrates an example computing device 1400 with which aspects of the present disclosure may be implemented in accordance with one or more implementations, including, for example systems 200, 300 (FIGS. 2, 3) and processes 400, 500 (FIGS. 5, 6). The computing device 1400 can be, and/or can be a part of, any computing device or server for generating the features and processes described above, including but not limited to a laptop computer, a smartphone, a tablet device, a wearable device such as a goggles or glasses, an earbud or other audio device, a case for an audio device, and the like. The computing device 1400 may include various types of computer readable media and interfaces for various other types of computer readable media. The computing device 1400 includes a permanent storage device 1402, a system memory 1404 (and/or buffer), an input device interface 1406, an output device interface 1408, a bus 1410, a ROM 1412, one or more processing unit(s) 1414, one or more network interface(s) 1416, and/or subsets and variations thereof.

The bus 1410 collectively represents all system, peripheral, and chipset buses that communicatively connect the numerous internal devices of the computing device 1400. In one or more implementations, the bus 1410 communicatively connects the one or more processing unit(s) 1414 with the ROM 1412, the system memory 1404, and the permanent storage device 1402. From these various memory units, the one or more processing unit(s) 1414 retrieves instructions to execute and data to process in order to execute the processes of the subject disclosure. The one or more processing unit(s) 1414 can be a single processor or a multi-core processor in different implementations.

The ROM 1412 stores static data and instructions that are needed by the one or more processing unit(s) 1414 and other modules of the computing device 1400. The permanent storage device 1402, on the other hand, may be a read-and-write memory device. The permanent storage device 1402 may be a non-volatile memory unit that stores instructions and data even when the computing device 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random-access memory. The system memory 1404 may store any of the instructions and data that one or more processing unit(s) 1414 may need at runtime. In one or more implementations, the processes of the subject disclosure are stored in the system memory 1404, the permanent storage device 1402, and/or the ROM 1412. From these various memory units, the one or more processing unit(s) 1414 retrieves instructions to execute and data to process in order to execute the processes of one or more implementations.

The bus 1410 also connects to the input and output device interfaces 1406 and 1408. The input device interface 1406 enables a user to communicate information and select commands to the computing device 1400. Input devices that may be used with the input device interface 1406 may include, for example, alphanumeric keyboards and pointing devices (also called "cursor control devices"). The output device interface 1408 may enable, for example, the display of images generated by computing device 1400. Output devices that may be used with the output device interface 1408 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1410 also couples the computing device 1400 to one or more networks and/or to one or more network nodes through the one or more network interface(s) 1416. In this manner, the computing device 1400 can be a part of a network of computers (such as a LAN, a wide area network ("WAN"), or an Intranet, or a network of networks, such as the Internet. Any or all components of the computing device 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An audio encoding method, comprising:

parsing a sequence of audio samples contained within a frame of a predetermined size into a plurality of windows of smaller size;

transforming the audio samples in the windows into respective sets of frequency-domain coefficients, estimating a spectral envelope of the frame by:

arranging the frequency-domain coefficients of the windows according to an alignment pattern in which a lowest-frequency coefficient of one window is placed adjacent to a lowest frequency coefficient of its neighboring window and a highest frequency coefficient of another window is placed adjacent to a highest frequency coefficient of its neighboring window, and estimating the spectral envelope of the frame from the frequency-domain coefficients arranged according to the alignment pattern;

coding the audio samples of the frame with reference to the spectral envelope of the frame; and transmitting the coded audio samples to a channel.

2. The audio encoding method of claim 1, further comprising, before the parsing into a plurality of windows:

detecting a presence of an audio transient in input frames of audio, for frames determined to contain an audio transient, repeating the audio encoding method of claim 1, and for frames determined not to contain an audio transient, coding the frames according to an alternative coding technique.

3. The audio encoding method of claim 1, wherein the arranging of the frequency-domain coefficients is according to a first alignment pattern, and the first alignment pattern includes concatenating the windows of the frequency-domain coefficients into a series of windows for the frame, where the frequency-domain coefficients within each window are ordered by frequency, and ordering by frequency is reversed between neighboring windows in the series.

4. The audio encoding method of claim 1, wherein the arranging of the frequency-domain coefficients is according to a second alignment pattern, and the second alignment pattern includes sorting the frequency-domain coefficients of all windows according to frequency such that a frequency coefficients for a lowest frequency from all windows are neighboring each other in the second alignment pattern.

5. The audio encoding method of claim 1, wherein the estimating of the spectral envelope includes estimating linear prediction (LP) parameters corresponding to the frequency-domain coefficients arranged according to the alignment pattern.

6. The audio encoding method of claim 1, wherein the coding comprises:

normalizing the frequency-domain coefficients with reference to the spectral envelope including dividing the frequency-domain coefficients by corresponding magnitudes of the spectral envelope, and coding the normalized values.

7. The audio encoding method of claim 6, further comprising:

detecting whether the normalized frequency-domain coefficients have periodic characteristics, coding a representation of the periodic characteristics, and removing the periodic characteristics from the normalized frequency-domain coefficients to produce reduced-correlation values;

wherein the coding of the audio samples codes the reduced correlation values.

8. The audio encoding method of claim 1, wherein the coding of the audio samples includes vector quantizing a vector of frequency-domain coefficients extracted from a plurality of the windows.

9. A system for audio encoding, comprising:

a processor; and a memory storing instructions, that when executed by the processor, cause the system to:

parse a sequence of audio samples contained within a frame of a predetermined size into a plurality of windows of smaller size, transform the audio samples in the windows into respective sets of frequency-domain coefficients, estimate a spectral envelope of the frame by:

arranging the frequency-domain coefficients of the windows according to an alignment pattern in which a lowest-frequency coefficient of one window is placed adjacent to a lowest-frequency coefficient of its neighboring window and a highest-frequency coefficient of another window is placed adjacent to a highest-frequency coefficient of its neighboring window, and estimating the spectral envelope of the frame from the frequency-domain coefficients arranged according to the alignment pattern, code the audio samples of the frame with reference to the spectral envelope of the frame; and a transmitter to transmit the coded audio samples to a channel.

10. A non-transitory computer readable memory storing instructions for encoding audio that, when executed by a processor, cause the processor to:

parse a sequence of audio samples contained within a frame of a predetermined size into a plurality of windows of smaller size, transform the audio samples in the windows into respective sets of frequency-domain coefficients, estimate a spectral envelope of the frame by:

arranging the frequency-domain coefficients of the windows according to an alignment pattern in which a lowest-frequency coefficient of one window is placed adjacent to a lowest frequency coefficient of its neighboring window and a highest frequency coefficient of another window is placed adjacent to a highest frequency coefficient of its neighboring window, and estimating the spectral envelope of the frame from the frequency-domain coefficients arranged according to the alignment pattern and code the audio samples of the frame with reference to the spectral envelope of the frame; and transmit the coded audio samples to a channel.

11. An audio encoding method, comprising:

detecting, from a frame of audio samples, whether an audio transient occurs within the frame and a level of confidence in the detection of the audio transient;

when an audio transient is detected:

parsing a sequence of audio samples contained within a frame of a predetermined size into a plurality of windows of smaller size, transforming the audio samples in the windows into respective sets of frequency-domain coefficients; and estimating a spectral envelope of the frame by:

when an audio transient is detected at a first level of confidence, arranging the frequency-domain coefficients according to a first alignment pattern, the first alignment pattern including concatenating the windows of the frequency coefficients into a series of windows for the frame, where the frequency coefficients within each window are ordered by frequency, and ordering by frequency is reversed between neighboring windows in the series, and when an audio transient is detected at a second level of confidence lower than the first level of confidence, arranging of the frequency-domain coefficients according to a second alignment pattern, the second alignment pattern including sorting the frequency coefficients of all windows according to frequency such that a frequency coefficient for a lowest frequency from all windows are neighboring each other in the second alignment pattern;

coding the audio samples of the frame with reference to the spectral envelope of the frame; and transmitting the coded audio samples to a channel.

12. An audio decoding method, comprising:

receiving coded audio data from a channel;

decoding a frame of normalized coefficients with reference to a spectral envelope of the frame, the spectral envelope defined by an envelope representation provided in the coded audio data, the decoding including denormalizing the normalized coefficients according to the spectral envelope; and transforming the scaled coefficients of the frame from a domain of transform coefficients to a domain of time samples;

wherein the transforming occurs on a window granularity at a smaller size than a size of the frame, and the spectral envelope is defined according to an alignment pattern in which a lowest-frequency coefficient of a first window is placed adjacent to a lowest-frequency coefficient of its neighboring window and a highest frequency coefficient of the first window is placed adjacent to a highest-frequency coefficient of another neighboring window.

13. The audio decoding method of claim 12, further comprising, before the de-normalizing of the normalized coefficients:

decoding, from the encoded audio signal, an indication of presence of an audio transient in frame of the encoded audio signal, for frames indicated as containing an audio transient, repeating the audio decoding method of claim 12, and for frames indicated as not containing an audio transient, decoding the frame according to an alternative decoding technique.

14. The audio decoding method of claim 12, wherein the alignment pattern is a first alignment pattern, and the first alignment pattern includes concatenating windows of the frequency-domain coefficients generated by the transforming into a series of windows for the frame, where the frequency-domain coefficients within each window are ordered by frequency, and ordering by frequency is reversed between neighboring windows in the series.

15. The audio decoding method of claim 12, wherein the alignment pattern is a second alignment pattern, and the second alignment pattern includes sorting the frequency-domain coefficients of all windows according to frequency such that a frequency-domain coefficient for a lowest frequency from all windows are neighboring each other in the second alignment pattern.

16. The audio decoding method of claim 12, wherein the indication of the spectral envelope includes linear prediction (LP) corresponding to the frequency-domain coefficients arranged according to the alignment pattern.

17. The audio decoding method of claim 12, wherein the de-normalizing comprises dividing the frequency-domain coefficients by corresponding magnitudes of the spectral envelope to produce de-normalized frequency coefficients.

18. The audio decoding method of claim 17, further comprising:

decoding, from the encoded audio signal, an indication of a representation of periodic characteristics of the normalized frequency-domain coefficients to produce reduced-correlation values; and prior to the de-normalizing, applying the periodic characteristics to the normalized frequency-domain coefficients.

19. The audio decoding method of claim 12, wherein the decoding of the encoded audio signal to determine normalized frequency-domain coefficients includes inverse vector quantizing a vector of frequency-domain coefficients from a plurality of windows generated by the transforming.

20. A system for audio decoding, comprising:

a processor; and a memory storing instructions, that when executed by the processor, cause the system to:

decode, for a frame of a predetermined size comprising a plurality of time-domain windows of smaller size, an encoded audio signal to determine normalized frequency-domain coefficients for the frame and an indication of a spectral envelope for the frame arranged according to an alignment pattern, wherein the alignment pattern places a lowest-frequency coefficient of one window adjacent to a lowest frequency coefficient of its neighboring window and places a highest frequency coefficient of another window adjacent to a highest frequency coefficient of its neighboring window, de-normalize the normalized frequency-domain coefficients for the frame with reference to the spectral envelope for the frame, inverse transform the de-normalized frequency-domain coefficients corresponding to the time-domain windows of the frame into decoded audio samples for the time-domain windows; and a receiver to receive the encoded audio signal from a channel.

21. A non-transitory computer readable memory storing instructions for decoding audio that, when executed by a processor, cause the processor to:

receive an encoded audio signal from a channel;

decode, for a frame of a predetermined size comprising a plurality of time-domain windows of smaller size, the encoded audio signal to determine normalized frequency-domain coefficients for the frame and an indication of a spectral envelope for the frame arranged according to an alignment pattern, wherein the alignment pattern places a lowest-frequency coefficient of one window adjacent to a lowest frequency coefficient of its neighboring window and places a highest frequency coefficient of another window adjacent to a highest frequency coefficient of its neighboring window, de-normalize the normalized frequency-domain coefficients for the frame with reference to the spectral envelope for the frame, inverse transform the de-normalized frequency-domain coefficients corresponding to the time-domain windows of the frame into decoded audio samples for the time-domain windows.

* * * * *